US009462084B2

United States Patent
Connor et al.

(10) Patent No.: US 9,462,084 B2
(45) Date of Patent: Oct. 4, 2016

(54) PARALLEL PROCESSING OF SERVICE FUNCTIONS IN SERVICE FUNCTION CHAINS

(71) Applicant: Intel Corporation, Santa Clara, CA (US)

(72) Inventors: Patrick Connor, Beaverton, OR (US); Ira Weiny, Livermore, CA (US); Iosif Gasparakis, Tigard, OR (US); Alexander W. Min, Portland, OR (US); Andrew J. Herdrich, Hillsboro, OR (US); Dinesh Kumar, Beaverton, OR (US); Tsung-Yuan C. Tai, Portland, OR (US); Brian J. Skerry, Gilbert, AZ (US)

( * ) Notice: Subject to any disclaimer, the term of this patent is extended or adjusted under 35 U.S.C. 154(b) by 71 days.

(21) Appl. No.: 14/580,826

(22) Filed: Dec. 23, 2014

(65) Prior Publication Data

US 2016/0182684 A1 Jun. 23, 2016

(51) Int. Cl.
*H04L 12/24* (2006.01)
*H04L 29/06* (2006.01)

(52) U.S. Cl.
CPC ..................... *H04L 67/42* (2013.01)

(58) Field of Classification Search
USPC ................ 709/203, 223, 225, 224, 226, 242
See application file for complete search history.

(56) References Cited

U.S. PATENT DOCUMENTS

| 6,505,228 | B1* | 1/2003 | Schoening | G06F 9/4887 709/223 |
| 6,769,124 | B1* | 7/2004 | Schoening | G06F 9/4435 707/999.1 |
| 2002/0144106 | A1* | 10/2002 | Enomoto | H04L 63/10 713/100 |
| 2004/0133678 | A1* | 7/2004 | Tamura | G06F 17/30569 709/225 |
| 2014/0334488 | A1* | 11/2014 | Guichard | H04L 45/306 370/392 |
| 2014/0362857 | A1* | 12/2014 | Guichard | H04L 45/566 370/392 |
| 2015/0092564 | A1* | 4/2015 | Aldrin | H04L 41/5038 370/241.1 |
| 2015/0131484 | A1* | 5/2015 | Aldrin | H04L 41/12 370/254 |
| 2015/0215172 | A1* | 7/2015 | Kumar | H04L 43/026 709/223 |
| 2015/0236948 | A1* | 8/2015 | Dunbar | H04L 45/22 370/225 |
| 2016/0119226 | A1* | 4/2016 | Guichard | H04L 29/0653 370/392 |

* cited by examiner

*Primary Examiner* — Jude Jean Gilles
(74) *Attorney, Agent, or Firm* — Barnes & Thornburg LLP

(57) ABSTRACT

Technologies for identifying service functions that may be performed in parallel in a service function chain include a computing device for running one or more virtual machines for each of a plurality of service functions based on a preferred service function chain being selected. To identify which service functions may be performed in parallel, the computing device may determine which service functions are not required to be performed on a critical path of the service function chain and/or which service functions are not required to be performed in real-time. Additionally, selecting the preferred service function chain may be based on selection criteria.

25 Claims, 6 Drawing Sheets

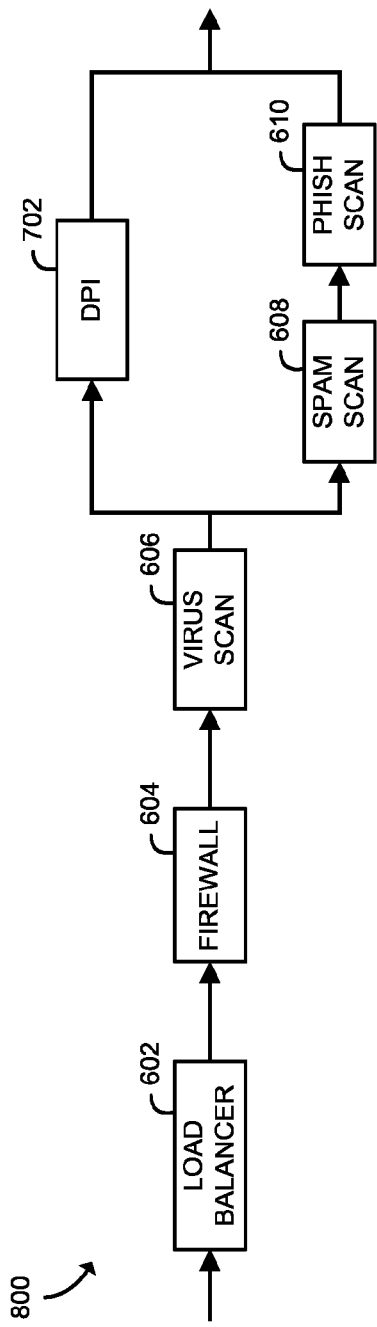
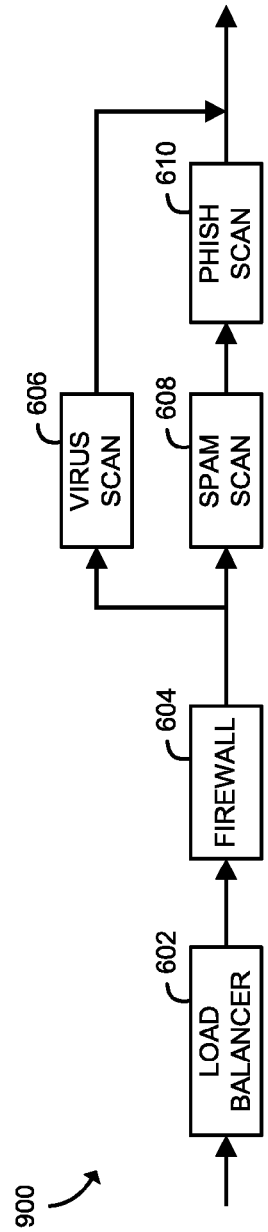
FIG. 8
FIG. 9 ns of service
functions in service function
chains

BACKGROUND

Modern computing devices have become ubiquitous tools for personal, business, and social uses. As such, many modern computing devices are capable of connecting to various data networks, including the Internet and corporate intranets, to retrieve and transmit/receive data communications (i.e., network packets) from remote computing devices (e.g., servers, databases, etc.). Multiple remote computing devices (i.e., from the perspective of a client computing device) may be networked together to form a data center, wherein one or more remote computing devices are typically provisioned to perform particular network functions (e.g., packet inspection, intrusion detection, and firewalls). While traditional remote computing devices have included dedicated hardware to perform the particular network functions, network functions are becoming increasingly virtualized. For example, network functions virtualization (NFV) is a network architecture concept being relied upon by data center administrators to build dynamic, virtualized networks using virtual machines (VMs). As the virtualized network functions are being increasingly performed on VMs, the virtualized network functions can be executed on off-the-shelf servers with general purpose processors.

Virtualized network functions, or service functions, can be dynamically chained together to form a service function chain in a process referred to as service chaining. In a service function chain, each service function is performed by one or more VMs spun specifically to perform a particular service function of the service function chain. Which service functions are included in a service function chain may be tailored to a property associated with a network packet (e.g., payload type, network packet overhead). For example, an administrator of a data center may define a service function chain of security service functions (e.g., a virtualized firewall function, a virtualized intrusion detection function, etc.), each of which may be configured to process, in a particular order, network packets received from a computing device. However, processing the network packets in such a serial-based order may introduce latency and bottlenecking through multiple service functions of the service function chain. For example, the slowest service function in the service function chain becomes the limiter to performance scaling.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 8 is simplified block diagram of another embodiment of a service function chain that may be generated by the methods of FIGS. 4 and 5; and FIG. 9 is simplified block diagram of another embodiment of a service function chain that may be generated by the methods of FIGS. 4 and 5.

DETAILED DESCRIPTION OF THE DRAWINGS

Figure 1:
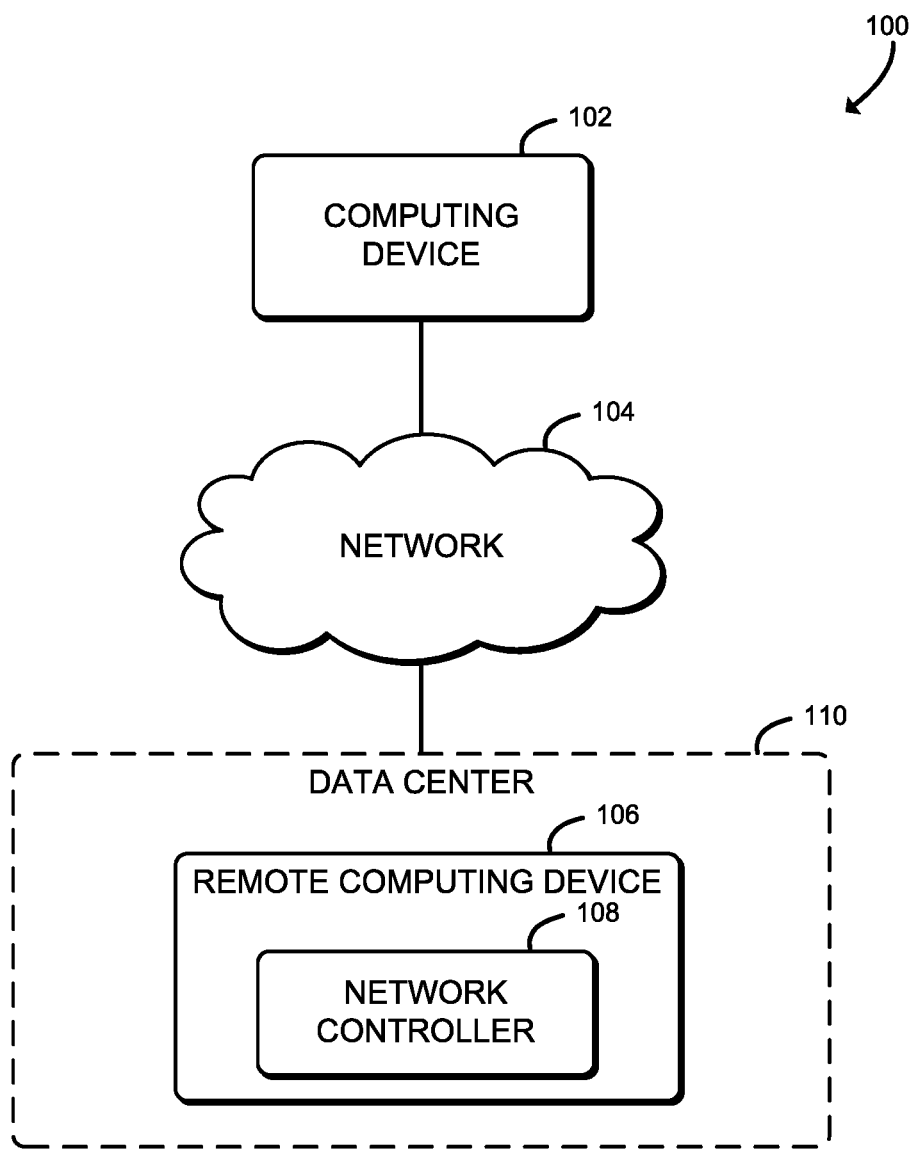
FIG. 1 is a simplified block diagram of at least one embodiment of a system for processing network packets through a service function chain including a number of service functions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for processing network packets through a service function chain includes a computing device 102 connected to a remote computing device 106 including a network controller 108 (e.g., the control plane). In some embodiments, the remote computing device 106 may be located in a data center 110. The data center 110 may be a highly heterogeneous data center environment including any number of remote computing devices 106. In some embodiments, the network controller 108 may be included in the remote computing device 106, as illustrated in FIG. 1, or located externally to the remote computing device 106, depending on the networking architecture and number of remote computing devices 106 in the data center 110. In use, network packets are transmitted between the computing device 102 and the remote computing device 106 over a network 104. Any suitable communication protocol (e.g., TCP/IP) may be used to effectuate transmission of the network packets between the respective devices, depending on, for example, the particular type or configuration of the remote computing device 106.

In use, as will be described in further detail below, upon receipt of a network packet from the computing device 102, the remote computing device 106 determines which network functions or services (e.g., firewall services, network address translation (NAT) services, load-balancing services, deep packet inspection (DPI) services, transmission control protocol (TCP) optimization services, etc.) are required to be performed on the network packet. In some embodiments, the required services may be determined based on flow policies, or rules, corresponding to attributes associated with the network packet, such as type of network packet. For example, a web traffic network packet may require an intrusion detection service, an application delivery controller service, and a firewall service. The attributes associated with the network packet may span various layers of the Open Systems Interconnection (OSI) model. For example, the attributes may include application layer information, internet protocol (IP) header information, destination information (e.g., destination port, IP, DNS, etc.), and/or the like.

In traditional network architectures, each service is typically performed on a separate physical device that includes service specific hardware configured to perform one particular service. In contrast, software-based networking architectures (e.g., software defined networking (SDN) and network functions virtualization (NFV)) may use software to instantiate virtual instances of the network functions or services required for the received network packet in a service function chain. Service function chaining is a process of placing the virtualized service instances, or service functions, in an ordered sequence and creating one or more virtual machines (VMs) across one or more physical remote computing devices, such as the remote computing device 106, for example.

In a conventional service function chain operation, after a received network packet has been processed by one service function, it must be forwarded to the next service function for processing based on the order defined by the service function chain. Additionally, in the conventional service function chain operation, a serial network packet processing pipeline is created where each service function waits on the previous service function in the service chain to complete before it can begin. As will be discussed in further detail below, the network controller 108 determines an appropriate service function chain based on the required services and instantiates one or more VMs to perform the virtual service functions according to the service function chain. Some service functions, such as DPI, intrusion detection systems (IDS), and intrusion prevention systems (IPS), typically require process-intensive analysis, which can result in bottlenecks due to the latency associated with performing the service functions.

Certain service functions, such as DPI or IDS, may not require being performed on the critical path of the service function chain. In other words, certain service functions of the service function chain may not depend on other service functions of the service function chain. Therefore, the independent service functions may be performed concurrently (i.e., in parallel) with one or more of the other service functions of the service function chain. For example, the network controller 108 may not determine whether to drop or further transmit the network packet until all service functions of the service function chain are performed. As such, the DPI service can be scheduled to occur in parallel with one or more of the other service functions of the service function chain, thereby hiding the latency associated with the DPI service and decreasing the overall latency associated with all of the service functions of the service function chain. Further, due to the service function chain being created in VMs, the service functions of the service chain and their order therein can be altered dynamically. For example, a service function being performed may trigger an alert to the network controller 108 to perform an additional service function (i.e., add a service function to the service function chain) based on the alert. In another example, a service function being performed may trigger an alert to the network controller 108 that the particular service function may have a longer than expected latency and that another service function, if available, may be performed in parallel. Additionally or alternatively to being performed in parallel, such service functions identified as capable of being performed in parallel may be performed asynchronously, such that the results affect a future state of the service function chain a deferred period of time later (i.e., not necessarily performed immediately).

The computing device 102 may be embodied as, or otherwise include, any type of computing device capable of performing the functions described herein including, but not limited to a server computer, a desktop computer, a laptop computing device, a home automation gateway device, a programmable logic controller, a smart appliance, a consumer electronic device, a wireless access point, a network switch, a network router, a mobile computing device, a mobile phone, a smart phone, a tablet computing device, a personal digital assistant, a wearable computing device, and/or other type of computing device. As such, the computing device 102 may include devices and structures commonly found in a computing device such as processors, memory devices, communication circuitry, and data storages, which are not shown in FIG. 1 for clarity of the description. In some embodiments, the remote computing device 106 may be configured to transmit and/or receive network packets to/from the computing device 102.

The network 104 may be configured as any type of wired or wireless communication network, including cellular networks (e.g., Global System for Mobile Communications (GSM)), digital subscriber line (DSL) networks, cable networks, telephony networks, local or wide area networks, global networks (e.g., the Internet), or any combination thereof. Additionally, the network 104 may include any number of additional network communication devices (e.g., routers, switches, hubs, etc.) as needed to facilitate communication between the respective devices.

In use, the remote computing device 106 is configured to communicate with the computing device 102 via the network 104. As will be discussed in more detail below, the remote computing device 106 is further configured to facilitate the spawning of VMs for performing service functions of service function chains. Additionally or alternatively, in some embodiments, the remote computing device 106 may create separate threads, processes, or containers for performing service functions of service function chains. The remote computing device 106 may be embodied as any type of computation or computing device capable of performing the functions described herein, including, without limitation, a computer, a smartphone, a tablet computer, a laptop computer, a notebook computer, a mobile computing device, a wearable computing device, a multiprocessor system, a server, a rack-mounted server, a blade server, a network appliance, a web appliance, a distributed computing system, a processor-based system, and/or a consumer electronic device. In some embodiments, the remote computing device 106 may be capable of operating in a data center 110 employing an SDN architecture and/or an NFV architecture.

In use, the network controller 108 is configured to control the creation of service function VMs and to steer network packets received by the remote computing device 106 through the created service function VMs (i.e., a service function path). As described in further detail below, the network controller 108 directs the remote computing device 106, or multiple remote computing devices 106, to create one or more VMs for each service function in the service function chain. Additionally, the network controller 108 may provide instructions indicating to the remote computing device 106 how to steer the network packets through the service function path, rather than directly steering the network packets through the service function path itself. The network controller 108 may be embodied as, or otherwise include, any type of hardware, software, and/or firmware capable of generating service function paths and controlling the flow of the network packets through the service function paths. In some embodiments, the network controller 108 may be internal to the remote computing device 106, external to the remote computing device 106, and/or both. For example, the network controller 108 may be embodied internal to the remote computing device 106 as a hypervisor or virtual machine manager (VMM), or external to the remote computing device 106 as an SDN controller or an NFV manager and orchestrator (MANO). In such embodiments where the network controller 108 may be embodied external to the remote computing device 106, it should be appreciated that the network controller may be embodied in another remote computing device, which may be located in the data center 110.

The data center 110 may be embodied as a traditional datacenter, computing cluster, or other collection of computing machines that includes any number of remote computing devices 106 in communication over the network 104. The data center 110 may additionally include a network switching fabric, a storage area network, and/or other typical datacenter components not shown in FIG. 1 for clarity of the description. In some embodiments, the data center 110 may employ an SDN architecture and/or an NFV architecture.

Figure 2:
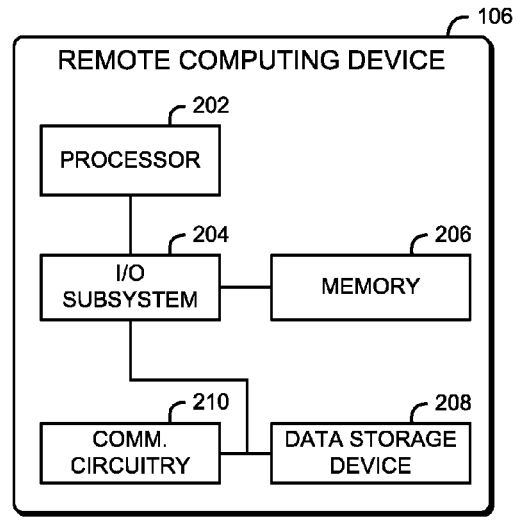
FIG. 2 is a simplified block diagram of at least one embodiment of a remote computing device of the system of FIG. 1.

Referring now to FIG. 2, an illustrative remote computing device 106 includes a processor 202, an input/output (I/O) subsystem 204, a memory 206, a data storage device 208, and communication circuitry 210. Of course, the remote computing device 106 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 206, or portions thereof, may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. Similarly, the memory 206 may be embodied as any type of volatile or non-volatile memory or data storage capable of performing the functions described herein. In operation, the memory 206 may store various data and software used during operation of the remote computing device 106, such as operating systems, applications, programs, libraries, and drivers. The memory 206 is communicatively coupled to the processor 202 via the I/O subsystem 204, which may be embodied as circuitry and/or components to facilitate input/output operations with the processor 202, the memory 206, and other components of the remote computing device 106. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and other components of the remote computing device 106, on a single integrated circuit chip.

The data storage device 208 may be embodied as any type of device or devices configured for short-term or long-term storage of data such as, for example, memory devices and circuits, memory cards, hard disk drives, solid-state drives, or other data storage devices. The communication circuitry 210 may be embodied as any communication circuit, device, or collection thereof, capable of enabling communications between the computing device 102 over the network 104, the network controller 108, and other remote computing devices 106. The communication circuitry 210 may be configured to use any one or more communication technologies (e.g., wireless or wired communications) and associated protocols (e.g., Ethernet, Bluetooth®, Wi-Fi®, WiMAX, etc.) to effectuate such communication. In some embodiments, the communication circuitry 210 includes cellular communication circuitry and/or other long-ranged wireless communication circuitry. The communication circuitry 210 may include a network interface card (NIC) (not shown). The NIC may connect the remote computing device 106 to one or more computing devices 102, network devices, switches, remote hosts, or other devices. The NIC may be embodied as one or more add-in-boards, daughtercards, network interface cards, controller chips, chipsets, or other devices that may be used by the remote computing device 106 for network communications with computing devices 102. For example, the NIC may be embodied as an expansion card coupled to the I/O subsystem 204 over an expansion bus, such as PCI Express.

Figure 3:
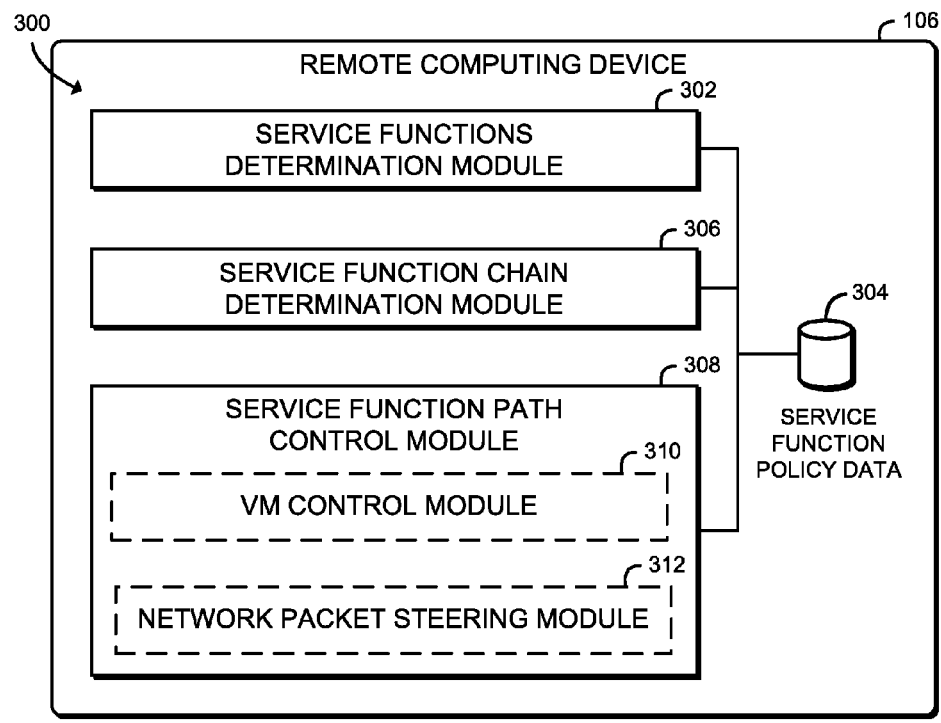
FIG. 3 is a simplified block diagram of at least one embodiment of an environment of the remote computing device of FIGS. 1 and 2.

Referring now to FIG. 3, in use, the remote computing device 106 establishes an environment 300 during operation. The illustrative environment 300 includes a service functions determination module 302, a service function chain determination module 306, and a service function path control module 308. The illustrative environment 300 additionally includes service function policy data 304 that may include information on service functions, such as which service functions to apply to particular network packets, dependencies between service functions, and/or the like.

The various modules of the environment 300 may be embodied as hardware, firmware, software, or a combination thereof. For example the various modules, logic, and other components of the environment 300 may form a portion of, or otherwise be established by, the processor 202 and/or other hardware components of the remote computing device 106. As such, in some embodiments, one or more of the modules of the environment 300 may be embodied as a circuit or collection of electrical devices (e.g., a service functions determination circuit, a service function chain topology determination circuit, and a service function path control circuit, etc.). Of course, the remote computing device 106 may include other components, sub-components, modules, and devices commonly found in a computing device, which are not illustrated in FIG. 3 for clarity of the description.

The service functions determination module 302 is configured to determine which service functions are required for each network packet received by the remote computing device 106. In some embodiments, determining the required service functions may be based on flow policies corresponding to a type (e.g., email, video, audio, web, etc.) and/or a payload of the network packet. Additionally or alternatively, in some embodiments, the flow policies may be received by the remote computing device 106 from an externally located network controller and/or stored in a lookup table in the service function policy data 304.

The service function chain determination module 306 is configured to determine a preferred service function chain based on the required service functions determined by the service functions determination module 302. The service function chain determination module 306 may determine the preferred service function chain based on service function dependency information (e.g., sequential dependencies, temporal dependencies, etc.). In some embodiments, the service function dependency information may be received from the externally located network controller and/or stored in a lookup table or database in the service function policy data 304. The service function chain determination module 306 may generate more than one possible service function chain and compare the possible service function chains based on present conditions of the remote computing device 106. The present conditions (i.e., service function chain selection criteria) may include the number and type of presently running VMs on the remote computing device 106, the number of remote computing devices 106 available, network bandwidth availability/utilization, quality of service (QoS) requirements, and/or properties of the components of the remote computing device(s) 106 (e.g., present capacity of the processor 202, amount of memory 206 available, amount of data storage available in the data storage device 208, etc.). As will be described in further detail below, to determine the preferred service function chain, the service function chain determination module 306 may be configured to determine which required service functions are required to be performed on the critical network packet processing path, which required service functions are required to be performed in real-time, and/or which required service functions may be performed in parallel with one or more other required service functions.

The service function path control module 308 is configured to control the generation of the service function path and manage the network packet as it is processed through each required service function of the service function path. In some embodiments, the service function path control module 308 generates the service function path based on the preferred service function chain determined by the service function chain determination module 306. To do so, the service function path control module 308 may include a VM control module 310 to spawn one or more VMs to process or otherwise perform a particular service function on the network packet. Of course, the service function path control module 308 may additionally or alternatively choose an already spawned VM to perform the particular service function on the network packet. Additionally or alternatively, service function path control module 308 may create separate threads, processes, or containers to perform a particular service function on the network packet. It should be appreciated that the service function path includes all of the service functions of the service function chain from which the service function path is generated. In other words, the service function path includes the service functions performed along the critical path, as well as any service functions performed in parallel with the critical path.

As noted previously, each VM may be configured to perform a service function on the network packet, such as one or more firewall services, NAT services, load balancing services, DPI services, and/or TCP optimization services, some of which may be performed in parallel. As will be described in more detail below, the preferred service function chain includes branches, where applicable, to perform identified service functions in parallel with the service functions being performed on the critical path. In some embodiments, the service function chain determination module 306 may include a network packet steering module 312 to enforce network packet forwarding policies (i.e., steer the network packets from one VM to the next VM based on the service function path via service forwarding entities). In some embodiments, the network packet forwarding policies may be received from the externally located network controller and/or stored in a lookup table in the service function policy data 304.

Figure 4:
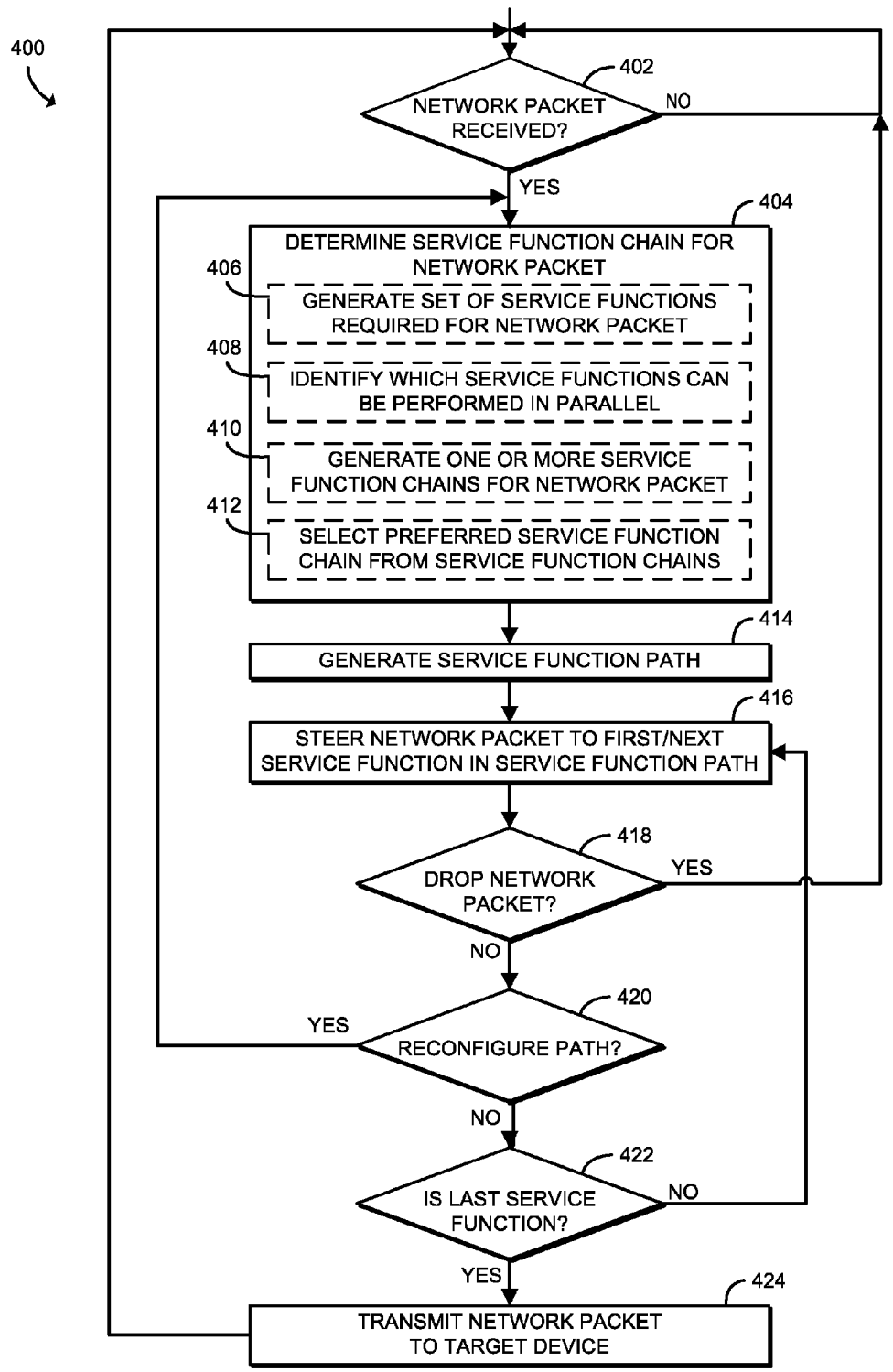
FIG. 4 is a simplified flow diagram of at least one embodiment of a method for processing a network packet through a service function path that may be executed by the remote computing device of FIGS. 1 and 2.

Referring now to FIG. 4, in use, the remote computing device 106 may execute a method 400 for processing a network packet through a service function chain including a plurality of service functions. As noted previously, in some embodiments the network controller 108 may be internal to the remote computing device 106 (e.g., a virtual machine manager, a hypervisor, etc.) and/or external to the remote computing device 106 (e.g., an SDN controller, a MANO, etc.). To preserve clarity of the description, the method 400 will be described as being executed by a remote computing device 106 that includes the network controller 108 as illustrated in FIG. 1. Of course, the remote computing device 106 may receive instructions from an externally located network controller, which the remote computing device 106 may use to perform the actions of the method 400 described herein.

The method 400 begins in block 402, in which the remote computing device 106 determines whether a network packet was received. For example, a network packet may be received from the computing device 102 requesting data that resides on the remote computing device 106. In another example, a network packet may be received from the computing device 102 requesting data that is external to the remote computing device 106 to which the remote computing device 106 has access. In other words, the remote computing device 106 may be acting as a security device, or firewall, positioned between two edge routers separating the computing device 102 and a remote content server, for example. In some embodiments, the method 400 may be initialized (i.e., started) upon receipt of the network packet, as opposed to employing a polling method (i.e., sampling at predetermined time intervals to determine whether a network packet was received). If a network packet was not received, the method 400 loops back to block 402 to determine whether a network packet has been received.

If a network packet was received at the remote computing device 106, the method 400 advances to block 404 to determine a service function chain for the received network packet. In some embodiments, the remote computing device 106 generates a set of required service functions required for the network packet in block 406. As noted previously, the set of required service functions may be based on flow policies that correspond to a type associated with the network packet. In some embodiments, the flow policies are provided to the remote computing device 106 from the network controller 108. For example, wherein a network packet is associated with an e-mail message, an example flow policy corresponding to network packets associated with e-mail messages may require one or more intrusion detection system service functions including various transactional proxies, such as a virus scan service function, a spam scan service function, and a phish scan service function. Additionally, the network controller 108 may predict additional and/or alternative service functions that may be required based on other characteristics of the network packet (e.g., network port, source IP address, etc.)

In some embodiments, the remote computing device 106 identifies which service functions may be performed in parallel in block 408. As will be described in more detail below, one or more parameters (e.g., whether the latency inducing service function is a pre-requisite for another service function) may be used to determine whether any of the service functions may be performed in parallel. For example, certain service functions, such as DPI, are typically network intensive and latency inducing service functions. As such, these certain service functions may become bottlenecks when incorporated into traditional serially arranged network service chains. Unlike serially arranged network service chains, wherein each service function in the service chain must be completed before the proceeding service function can begin, placing these certain service functions in parallel may reduce the overall latency of the network packet processed through the service function path.

Figure 6:
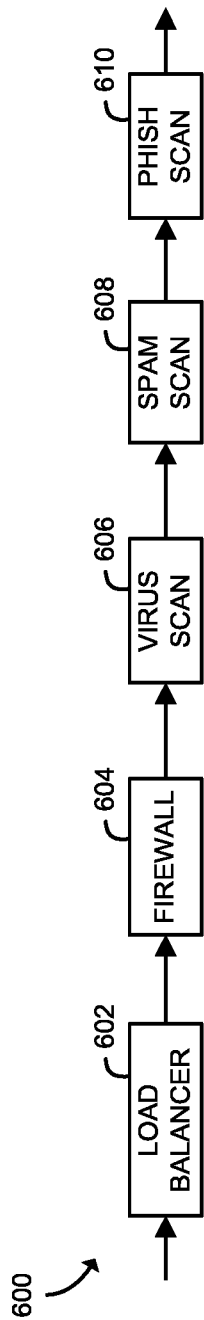
FIG. 6 is simplified block diagram of at least one embodiment of a service function chain that may be generated by the methods of FIGS. 4 and 5.

In some embodiments, the remote computing device 106 generates one or more service function chains for the network packet in block 410. Various service function chain topologies can be generated by the remote computing device 106 simply based on the required service functions. For example, for a network packet that requires a virus scan service function, a spam scan service function, and a phish scan service function, the scan service functions may be performed in any order. An example of a service function path based on a service function chain arranged serially is illustrated in FIG. 6, which will be described in further detail. Additional service function chain topologies can be generated by placing the service functions identified as capable of being performed in parallel into the service function chain in parallel with other service functions.

Referring again to FIG. 4, in some embodiments, the remote computing device 106 may select a preferred service function chain from the generated service function chains in block 412. In some embodiments, the network controller 108 may provide the remote computing device 106 with instructions indicating which service function chain to select. As noted previously, the remote computing device 106 may take into account service function chain selection criteria based on certain conditions occurring at the time the preferred service function chain is selected. For example, the service function chain selection criteria may include a number of VMs presently running on the remote computing device 106, the number of remote computing devices 106 available, network bandwidth availability/utilization, QoS requirements, and/or properties of the components of the remote computing device(s) 106 (e.g., processor capacity, available memory, available data storage, etc.). As such, received network packets of like type may not be processed using the same service function chain. Additionally, under certain conditions, performing some service functions in parallel while performing other service functions serially may not be as efficient as identifying particular service function processes for handling particular service functions.

In block 414, the remote computing device 106 generates a service function path which corresponds to the determined service function chain (e.g., the preferred service function chain selected in block 412). In use, the remote computing device 106 instantiates one or more VMs for each service function in the service function chain, resulting in a service function path. In block 416, the remote computing device 106 steers the network packet to the first service function in the service function path. In some embodiments, the network controller 108 directly controls network packet flow between the network functions via service forwarding entities on the remote computing device 106. In some embodiments, the network controller 108 provides instructions for the remote computing device 106 to forward the network packet between the network functions.

In block 418, the remote computing device 106 determines whether to drop the network packet based on the output of the service function that most recently processed the network packet. If not, the method 400 advances to block 420 to determine whether to reconfigure the service function path. If the remote computing device 106 determines to drop the network packet, the network packet is dropped and the method loops back to block 402 to determine whether another network packet has been received. Of course, in certain service function paths, the determination whether to drop the network packet may not be made until all service functions in the service function path have been completed.

Figure 7:
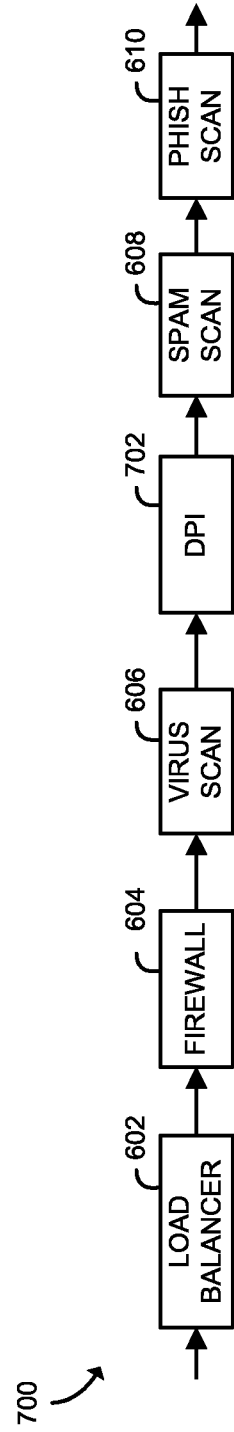
FIG. 7 is simplified block diagram of another embodiment of a service function chain that may be generated by the methods of FIGS. 4 and 5.

In block 420, the remote computing device 106 determines whether to reconfigure the service function path based on the output of the service function that most recently processed the network packet. If not, the method continues to block 422 to determine whether the last performed service function is the last service function in the service function path. If the remote computing device 106 determines to reconfigure the service function path, the method 400 loops back to block 404 to determine a reconfigured service function chain for the network packet in response to the output of the service function that most recently processed the network packet. For example, a service function output in block 420 may indicate that a further inspection is required of the network packet. In such an embodiment, the remote computing device 106 may dynamically adjust the portion of the service function chain subsequent to the service function that triggered the reconfiguration to include a DPI service function in block 404, as well as alter the service function path accordingly in block 414. An illustration of such an example is shown in FIGS. 7 and 8, which will be described in further detail below. Referring back to FIG. 4, in another example, a service function output in block 420 may indicate that a service function that is logically earlier in the service function path may result in a service function that is logically later in the service function path becoming void. For example, the network controller 108 may have predicted that a DPI service function may be needed based on a characteristic of the network packet, and placed the DPI service function toward the end of the service function chain. If, subsequently, a service function performed upstream of the scheduled DPI service function voids the need for the predicted DPI service function, the service function path may need to be reconfigured, with the predicted DPI service function potentially being removed. If the remote computing device 106 determines not to reconfigure the service function path, the method 400 advances to block 422.

In block 422, the remote computing device 106 determines whether the last performed service function is the last service function in the service function path. If not, the method loops back to block 416, where the remote computing device 106 steers the network packet to the next service function in the service function path. If the remote computing device 106 determines the last performed service function is the last service function in the service function path, the method 400 advances to block 424. In block 424, the network packet is transmitted to a target device before the method 400 loops back to block 402 to determine whether another network packet has been received.

Figure 5:
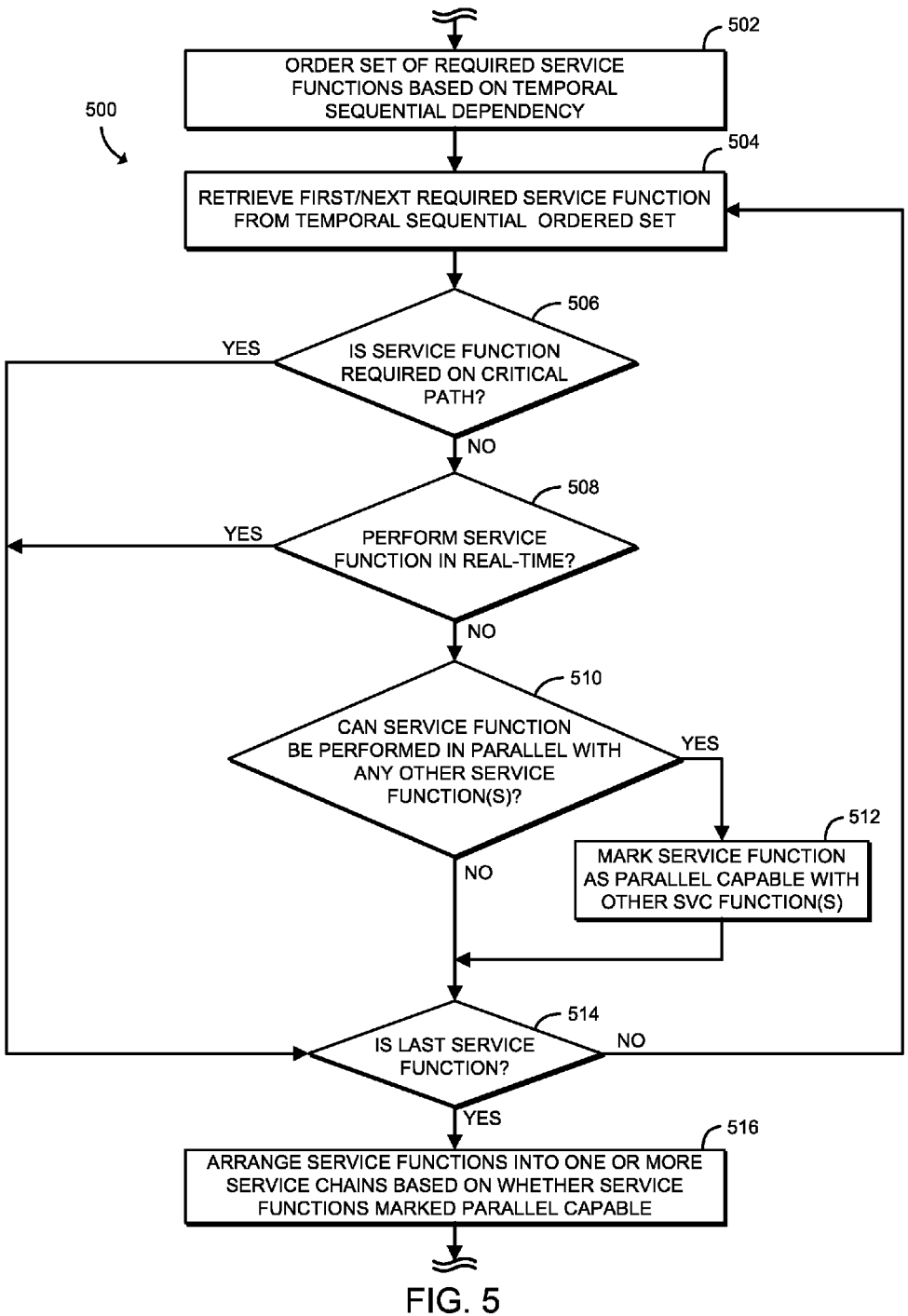
FIG. 5 is a simplified flow diagram of at least one embodiment of a method for identifying service functions that may be performed in parallel in a service function chain that may be executed by the remote computing device of FIGS. 1 and 2.

Referring now to FIG. 5, in use, the remote computing device 106 may execute a method 500 for identifying service functions that may be performed in parallel in a service function chain (see block 408 of method 400). The remote computing device 106 determines which service functions of the service function chain may be performed in parallel based on the network packet received by the remote computing device 106. The method 500 begins in block 502, in which the remote computing device 106 orders a set of required service functions based on a temporal sequential dependency. In other words, the remote computing device 106 orders the set of required service functions based on which required service functions need to be processed before other required service functions can be performed. Of course, one or more of the required service functions may not have any dependencies or may depend on more than one other service functions.

In block 504, the first required service function from the temporal sequential ordered set is retrieved by the remote computing device 106. In block 506, the remote computing device 106 determines whether the presently retrieved service function is required to be performed on the critical path. If the presently retrieved service function is required to be performed on the critical path, the method 500 advances to block 514, where the remote computing device 106 determines whether the presently retrieved service function is the last service function in the ordered set. If the remote computing device 106 determines the presently retrieved service function is not required to be performed on the critical path, the method 500 advances to block 508, where the remote computing device 106 determines whether the presently retrieved service function is required to be performed in real-time. If the presently retrieved service function is required to be performed in real-time, the method 500 advances to block 514 for the remote computing device 106 to determine whether the presently retrieved service function is the last service function in the ordered set.

If the remote computing device 106 determines the presently retrieved service function is not required to be performed in real-time, the method 500 advances to block 510 to determine whether the presently retrieved service function can be performed in parallel with any other service function(s). For example, a network packet that requires an encryption service function may be temporal sequential dependent on all other service functions being performed before the encryption service, so it may be placed last in the temporal sequential ordered set of required service functions; however, the encryption service function may not be required to be performed on the critical path or in real time. As such, the network controller 108 may determine the encryption service function may be performed in parallel with one or more other service functions, such as a DPI service function and/or an IPS service function, which may reduce the total latency of the service function chain(s) where the encryption service function in performed in parallel. It should be appreciated that blocks 506, 508, and 510 may be performed in any order and some embodiments may not include all of blocks 506, 508, and 510. It should be further appreciated that some embodiments may include additional and/or alternative identification means for identifying service functions that may be performed in parallel.

If the presently retrieved service function can be performed in parallel with any other service function(s), the method 500 continues to block 512 to mark the presently retrieved service function as parallel capable with the other service function(s). If the presently retrieved service function cannot be performed in parallel with any other service function(s), the method 500 advances to block 514. In block 514, the remote computing device 106 determines whether the presently retrieved service function is the last service function in the ordered set. If not, the method 500 loops back to block 504 to retrieve the next required service function from the temporal sequential ordered set. If the presently retrieved service function is the last service function in the ordered set, the method 500 advances to block 516, where the remote computing device 106 arranges the service functions into one or more service function chains before ending the method 500.

Referring now to FIG. 6, an illustrative service function chain 600 includes a load balancer service function 602, a distributed firewall service function 604, a virus scan service function 606, a spam scan service function 608, and a phish scan service function 610, each of which are being performed in serial along a critical path. Each service function of the service function chain 600 represents an abstracted service function to be initialized as one or more VMs on one or more remote computing devices 106, wherein each VM is to perform at least a portion of a particular service function. In some embodiments, one or more of the service functions may be performed across more than one remote computing device 106 (i.e., in a distributed environment), including those service functions that may be performed in parallel with other service function(s). For example, the firewall service function 604 may include more than one firewall service function instance performed as a distributed service function. In other words, each firewall service function instance will perform at least a portion of the required firewall service function. Any or all of the firewall service function instances may be spun up on the same remote computing device 106 or on different remote computing devices 106. Each firewall service function instance may be provided a mirrored, or duplicated, network packet on which to perform a particular subset of the firewall service function. For example, where the network packet is an e-mail type packet, one firewall service function instance may verify whether the port associated with the network packet corresponds to an allowable port, while another firewall service function instance may verify whether e-mail server information (e.g., Simple Mail Transfer Protocol (SMTP), Internet Message Access Protocol (IMAP) or Post Office Protocol (POP), Hypertext Transfer Protocol (HTTP), etc.) associated with the network packet is allowable.

Under certain conditions of the remote computing device(s) 106 (i.e., processing capacity, available bandwidth, etc.), the service function chain 600 may be determined by the network controller 108 as being a preferred service function chain. The network controller 108 may receive an output at each service function being performed, which may indicate whether to allow the network packet to continue, to drop the network packet, or indicate the network packet needs further processing. For example, the virus scan service function 606 indicating that the network packet requires further inspection (i.e., a DPI service function). Accordingly, the service function path generated from the service function chain 600 may no longer be adequate to further process the network packet, as it does not include the now required DPI service function.

Referring now to FIG. 7, an illustrative service function chain 700 includes the service functions of FIG. 6 and a DPI service function 702 placed in serial on the critical path subsequent to the virus scan service function 606 (i.e., the service function that triggered the reconfiguration). Under certain conditions of the remote computing device(s) 106 (i.e., processing capacity, available bandwidth, etc.), the service function chain 700 may be determined by the network controller 108 as being the preferred chain. Alternatively, the network controller 108 may have identified certain service functions that may be performed in parallel (i.e., do not have to be performed on the critical path). Under conditions permitting the remote computing device(s) 106 to perform identified service functions in parallel, the service function path generated from the service function chain 700 may not be preferred over other service function chain options that include one or more of the identified service functions being performed in parallel, such as the illustrated service function chain of FIG. 8.

Referring now to FIG. 8, an illustrative service function chain 800 includes the service functions of FIG. 7 with the DPI service function 702 placed in parallel with the spam scan service function 608 and the phish scan service function 610. The network controller 108 may generate one or more service function chains (e.g., the service function chains used by the network controller 108 to generate the service function chains 700, 800 of FIGS. 7 and 8) and select the preferred service function chain based on the present conditions of the remote computing device(s) 106 and/or which service functions may be performed in parallel. The network controller 108 may determine that the DPI service function 702 may be performed in parallel with the remaining service functions 608, 610. In doing so, the network controller 108 may determine that performing the DPI service function 702 is not dependent on the remaining service functions 608, 610 and at least some of the latency associated with performing the DPI service function 702 may be masked while performing the service functions 608, 610 in parallel. As a result, the latency associated with performing the DPI service function 702 is reduced, and under certain conditions, may be masked altogether. In some embodiments, the network packet may be a mirrored, or duplicated, network packet. Of course, in a remote computing device 106 with shared memory, the network packets may not need to be duplicated to perform the parallel service functions; however, if the network packet is modified, the remote computing device 106 should be configured to handle the modification across the service function path to avoid data corruption and/or errors during processing the network packet.

Referring now to FIG. 9, an illustrative service function chain 900 includes the service functions of FIG. 6 with the virus scan service function 606 placed in parallel with the spam scan service function 608 and the phish scan service function 610. The service function chain 900 may be an alternative service function chain to the service function chain 600 of FIG. 6. The network controller 108 may determine the virus scan service function 606, the spam scan service function 608, and the phish scan service function 610 may be performed in any order and/or that each of the service functions 606, 608, 610 are not dependent on the others being performed in a temporal sequential dependent order. Additionally or alternatively, the network controller 108 may determine that performing the virus scan service function 606 in parallel with the spam scan service function 608 and the phish scan service function 610 may reduce the overall latency associated with performing the service functions of the service function chain 600 of FIG. 6 in serial. As such, the network controller 108 may determine that the service function chain 900 is preferred over the service function chain 600. Of course, as noted previously, certain conditions of the remote computing device 106 may exist such that the service function chain 600 is preferred over the service function chain 900.

EXAMPLES

Illustrative examples of the technologies disclosed herein are provided below. An embodiment of the technologies may include any one or more, and any combination of, the examples described below.

Example 1 includes a computing device for processing a network packet through a service function path, the computing device comprising a service functions determination module to determine, based on the network packet, a set of service functions to be performed on the network packet; a service function chain determination module to determine a subset of the set of service functions that may be performed in parallel with other service functions in the set of service functions, generate one or more service function chains based on the set of service functions and the subset of the set of service functions, and select a preferred service function chain from the one or more service function chains based on a selection criteria; and a service function path control module to generate a service function path based on the preferred service function chain.

Example 2 includes the subject matter of Example 1, and wherein to determine the subset of the set of service functions that may be performed in parallel comprises to identify which service functions are not required to be performed on a critical path of the service function chain.

Example 3 includes the subject matter of any of Examples 1 and 2, and wherein to determine the subset of the set of service functions that may be performed in parallel comprises to identify which service functions are not required to be performed in real-time.

Example 4 includes the subject matter of any of Examples 1-3, and wherein to determine the subset of the set of service functions that may be performed in parallel comprises to identify which service functions are not required to be performed on a critical path of the service function chain and are not required to be performed in real-time.

Example 5 includes the subject matter of any of Examples 1-4, and wherein to determine the set of service functions based on the network packet comprises to determine the set of service functions based on a packet type associated with the network packet.

Example 6 includes the subject matter of any of Examples 1-5, and wherein to determine the set of service functions based on the network packet comprises to determine the set of service functions based on information included in the header of the network packet.

Example 7 includes the subject matter of any of Examples 1-6, and wherein to determine the set of service functions based on the network packet comprises to determine the set of service functions based on information included in the payload of the network packet.

Example 8 includes the subject matter of any of Examples 1-7, and wherein the service functions determination module is further to redetermine the set of service functions based on an output received from one of the service functions of the service function path that indicates the service function path requires reconfiguration, the service function chain determination module is further to redetermine the subset of the set of service functions that may be performed in parallel with other service functions in the set of service functions in response to the received output, regenerate one or more service function chains based on the set of service functions and the subset of the set of service functions, and reselect the preferred service function chain from the one or more service function chains based on the selection criteria subsequent to the regeneration of the one or more service function chains, and the service function path control module is further to regenerate the service function path for each of the set of service functions based on the preferred service function chain subsequent to the reselection of the preferred service function chain.

Example 9 includes the subject matter of any of Examples 1-8, and wherein the service function chain determination module is further to order the set of service functions based on a temporal sequential dependency.

Example 10 includes the subject matter of any of Examples 1-9, and wherein to select the preferred service function chain comprises to determine a total latency associated with processing the network packet through each of the service functions for each of the service function chains, to determine which service function chain has the lowest total latency, and to select the preferred service function chain based on the service function chain that has the lowest total latency.

Example 11 includes the subject matter of any of Examples 1-10, and wherein to generate the service function path comprises to generate one or more virtual machines for each of the set of service functions.

Example 12 includes the subject matter of any of Examples 1-11, and wherein the service function path control module is further to steer the network packet between the virtual machines.

Example 13 includes the subject matter of any of Examples 1-12, and wherein to generate the service function path comprises to generate one or more virtual machines for each of the set of service functions on one or more other computing devices.

Example 14 includes the subject matter of any of Examples 1-13, and wherein the selection criteria comprises at least one of a number of VMs active on the computing device, an availability of network bandwidth, a utilization of network bandwidth, a quality of service (QoS) requirement, a present capacity of a processor of the computing device, an availability of memory of the computing device, or an amount of data storage available in a data storage device of the computing device.

Example 15 includes a method for generating service function chains, the method comprising determining, by a computing device, a set of service functions to be performed on the network packet based on the network packet; determining, by the computing device, a subset of the set of service functions that may be performed in parallel with other service functions in the set of service functions; generating, by the computing device, one or more service function chains based on the set of service functions and the subset of the set of service functions; selecting, by the computing device, a preferred service function chain from the one or more service function chains based on a selection criteria; and generating, by the computing device, a service function path based on the preferred service function chain.

Example 16 includes the subject matter of Example 15, and wherein determining the subset of the set of service functions that may be performed in parallel comprises identifying which service functions are not required to be performed on a critical path of the service function chain.

Example 17 includes the subject matter of any of Examples 15 and 16, and wherein determining the subset of the set of service functions that may be performed in parallel comprises identifying which service functions are not required to be performed in real-time.

Example 18 includes the subject matter of any of Examples 15-17, and wherein determining the subset of the set of service functions that may be performed in parallel comprises identifying which service functions are not required to be performed on a critical path of the service function chain and are not required to be performed in real-time.

Example 19 includes the subject matter of any of Examples 15-18, and wherein determining the set of service functions based on the network packet comprises determining the set of service functions based on a packet type associated with the network packet.

Example 20 includes the subject matter of any of Examples 15-19, and wherein determining the set of service functions based on the network packet comprises determining the set of service functions based on information included in the header of the network packet.

Example 21 includes the subject matter of any of Examples 15-20, and wherein determining the set of service functions based on the network packet comprises determining the set of service functions based on information included in the payload of the network packet.

Example 22 includes the subject matter of any of Examples 15-21, and further including receiving an output from one of the service functions of the service function path indicating the service function path requires reconfiguration; redetermining the set of service functions in response to the receiving the output; redetermining the subset of the set of service functions that may be performed in parallel with other service functions in the set of service functions; regenerating one or more service function chains based on the set of service functions and the subset of the set of service functions; reselecting the preferred service function chain from the one or more service function chains based on the selection criteria subsequent to the regenerating one or more service function chains; and regenerating the service function path based on the preferred service function chain subsequent to the reselecting of the preferred service function chain.

Example 23 includes the subject matter of any of Examples 15-22, and further including ordering the set of service functions based on a temporal sequential dependency.

Example 24 includes the subject matter of any of Examples 15-23, and wherein selecting the preferred service function chain comprises determining a total latency associated with processing the network packet through each of the service functions for each of the service function chains; determining which service function has a lowest total latency; and selecting the preferred service function chain based on the service function chain having the lowest total latency.

Example 25 includes the subject matter of any of Examples 15-24, and wherein generating the service function path comprises generating one or more virtual machines for each of the set of service functions.

Example 26 includes the subject matter of any of Examples 15-25, and further including steering the network packet between the virtual machines.

Example 27 includes the subject matter of any of Examples 15-26, and wherein generating the service function path comprises generating one or more virtual machines for each of the set of service functions on one or more other computing devices.

Example 28 includes the subject matter of any of Examples 15-27, and wherein selecting the preferred service function chain from the one or more service function chains based on the selection criteria comprises selecting the preferred service function chain from the one or more service function chains based on at least one of a number of VMs active on the computing device, an availability of network bandwidth, a utilization of network bandwidth, a quality of service (QoS) requirement, a present capacity of a processor of the computing device, an availability of memory of the computing device, or an amount of data storage available in a data storage device of the computing device.

Example 29 includes a computing device comprising a processor and a memory having stored therein a plurality of instructions that when executed by the processor cause the computing device to perform the method of any of Examples 15-28.

Example 30 includes one or more machine readable storage media comprising a plurality of instructions stored thereon that in response to being executed result in a computing device performing the method of any of Examples 15-28.

Example 31 includes a computing device for generating service function chains, the computing device comprising means for determining, based on the network packet, a set of service functions to be performed on the network packet; means for determining a subset of the set of service functions that may be performed in parallel with other service functions in the set of service functions; means for generating one or more service function chains based on the set of service functions and the subset of the set of service functions; means for selecting a preferred service function chain from the one or more service function chains based on a selection criteria; and means for generating a service function path based on the preferred service function chain.

Example 32 includes the subject matter of Example 31, and wherein the means for determining the subset of the set of service functions that may be performed in parallel comprises means for identifying which service functions are not required to be performed on a critical path of the service function chain.

Example 33 includes the subject matter of any of Examples 31 and 32, and wherein the means for determining the subset of the set of service functions that may be performed in parallel comprises means for identifying which service functions are not required to be performed in real-time.

Example 34 includes the subject matter of any of Examples 31-33, and wherein the means for determining the subset of the set of service functions that may be performed in parallel comprises means for identifying which service functions are not required to be performed on a critical path of the service function chain and are not required to be performed in real-time.

Example 35 includes the subject matter of any of Examples 31-34, and wherein the means for determining the set of service functions based on the network packet comprises means for determining the set of service functions based on a packet type associated with the network packet.

Example 36 includes the subject matter of any of Examples 31-35, and wherein the means for determining the set of service functions based on the network packet comprises means for determining the set of service functions based on information included in the header of the network packet.

Example 37 includes the subject matter of any of Examples 31-36, and wherein the means for determining the set of service functions based on the network packet comprises means for determining the set of service functions based on information included in the payload of the network packet.

Example 38 includes the subject matter of any of Examples 31-37, and further including means for receiving an output from one of the service functions of the service function path indicating the service function path requires reconfiguration; means for redetermining the set of service functions in response to the receiving the output; means for redetermining the subset of the set of service functions that may be performed in parallel with other service functions in the set of service functions; means for regenerating one or more service function chains based on the set of service functions and the subset of the set of service functions; means for reselecting the preferred service function chain from the one or more service function chains based on the selection criteria subsequent to the regenerating one or more service function chains; and means for regenerating the service function path based on the preferred service function chain subsequent to the reselecting of the preferred service function chain.

Example 39 includes the subject matter of any of Examples 31-38, and further including means for ordering the set of service functions based on a temporal sequential dependency.

Example 40 includes the subject matter of any of Examples 31-39, and wherein the means for selecting the preferred service function chain comprises means for determining a total latency associated with processing the network packet through each of the service functions for each of the service function chains; means for determining which service function has a lowest total latency; and means for selecting the preferred service function chain based on the service function chain having the lowest total latency.

Example 41 includes the subject matter of any of Examples 31-40, and wherein the means for generating the service function path comprises means for generating one or more virtual machines for each of the set of service functions.

Example 42 includes the subject matter of any of Examples 31-41, and further including means for steering the network packet between the virtual machines.

Example 43 includes the subject matter of any of Examples 31-42, and wherein the means for generating the service function path comprises means for generating one or more virtual machines for each of the set of service functions on one or more other computing devices.

Example 44 includes the subject matter of any of Examples 31-43, and wherein the means for selecting the preferred service function chain from the one or more service function chains based on the selection criteria comprises means for selecting the preferred service function chain from the one or more service function chains based on at least one of a number of VMs active on the computing device, an availability of network bandwidth, a utilization of network bandwidth, a quality of service (QoS) requirement, a present capacity of a processor of the computing device, an availability of memory of the computing device, or an amount of data storage available in a data storage device of the computing device.

The invention claimed is:

1. A computing device for processing a network packet through a service function path, the computing device comprising:
   a service functions determination module to determine, based on the network packet, a set of service functions to be performed on the network packet;
   a service function chain determination module to (i) determine a subset of the set of service functions that may be performed in parallel with other service functions in the set of service functions, (ii) generate one or more service function chains based on the set of service functions and the subset of the set of service functions, and (iii) select a preferred service function chain from the one or more service function chains based on a selection criteria; and
   a service function path control module to generate a service function path based on the preferred service function chain.

2. The computing device of claim 1, wherein to determine the subset of the set of service functions that may be performed in parallel comprises to identify which service functions are at least one of not required to be performed on a critical path of the service function chain or not required to be performed in real-time.

3. The computing device of claim 1, wherein to determine the set of service functions based on the network packet comprises to determine the set of service functions based on at least one of a packet type associated with the network packet, information included in the header of the network packet, or information included in the payload of the network packet.

4. The computing device of claim 1, wherein:
   the service functions determination module is further to redetermine the set of service functions based on an output received from one of the service functions of the service function path that indicates the service function path requires reconfiguration, the service function chain determination module is further to (i) redetermine the subset of the set of service functions that may be performed in parallel with other service functions in the set of service functions in response to the received output, (ii) regenerate one or more service function chains based on the set of service functions and the subset of the set of service functions, and (iii) reselect the preferred service function chain from the one or more service function chains based on the selection criteria subsequent to the regeneration of the one or more service function chains, and the service function path control module is further to regenerate the service function path for each of the set of service functions based on the preferred service function chain subsequent to the reselection of the preferred service function chain.

5. The computing device of claim 1, wherein to select the preferred service function chain comprises to determine a total latency associated with processing the network packet through each of the service functions for each of the service function chains, to determine which service function chain has the lowest total latency, and to select the preferred service function chain based on the service function chain that has the lowest total latency.

6. The computing device of claim 1, wherein to generate the service function path comprises to generate one or more virtual machines for each of the set of service functions.

7. The computing device of claim 1, wherein to generate the service function path comprises to generate one or more virtual machines for each of the set of service functions on one or more other computing devices.

8. The computing device of claim 1, wherein the selection criteria comprises at least one of a number of VMs active on the computing device, an availability of network bandwidth, a utilization of network bandwidth, a quality of service (QoS) requirement, a present capacity of a processor of the computing device, an availability of memory of the computing device, or an amount of data storage available in a data storage device of the computing device.

9. A method for generating service function chains, the method comprising:
   determining, by a computing device, a set of service functions to be performed on the network packet based on the network packet;
   determining, by the computing device, a subset of the set of service functions that may be performed in parallel with other service functions in the set of service functions;
   generating, by the computing device, one or more service function chains based on the set of service functions and the subset of the set of service functions;
   selecting, by the computing device, a preferred service function chain from the one or more service function chains based on a selection criteria; and
   generating, by the computing device, a service function path based on the preferred service function chain.

10. The method of claim 9, wherein determining the subset of the set of service functions that may be performed in parallel comprises identifying which service functions are at least one of not required to be performed on a critical path of the service function chain or not required to be performed in real-time.

11. The method of claim 10, wherein determining the set of service functions based on the network packet comprises determining the set of service functions based on at least one of a packet type associated with the network packet, information included in the header of the network packet, or information included in the payload of the network packet.

12. The method of claim 9, further comprising:
   receiving an output from one of the service functions of the service function path indicating the service function path requires reconfiguration;

redetermining the set of service functions in response to the receiving the output;
  redetermining the subset of the set of service functions that may be performed in parallel with other service functions in the set of service functions;
  regenerating one or more service function chains based on the set of service functions and the subset of the set of service functions;
  reselecting the preferred service function chain from the one or more service function chains based on the selection criteria subsequent to the regenerating one or more service function chains; and
  regenerating the service function path based on the preferred service function chain subsequent to the reselecting of the preferred service function chain.

13. The method of claim 9, further comprising:
  ordering the set of service functions based on a temporal sequential dependency.

14. The method of claim 9, wherein selecting the preferred service function chain comprises:
  determining a total latency associated with processing the network packet through each of the service functions for each of the service function chains;
  determining which service function has a lowest total latency; and
  selecting the preferred service function chain based on the service function chain having the lowest total latency.

15. The method of claim 9, wherein generating the service function path comprises generating one or more virtual machines for each of the set of service functions.

16. The method of claim 9, wherein generating the service function path comprises generating one or more virtual machines for each of the set of service functions on one or more other computing devices.

17. The method of claim 9, wherein selecting the preferred service function chain from the one or more service function chains based on the selection criteria comprises selecting the preferred service function chain from the one or more service function chains based on at least one of a number of VMs active on the computing device, an availability of network bandwidth, a utilization of network bandwidth, a quality of service (QoS) requirement, a present capacity of a processor of the computing device, an availability of memory of the computing device, or an amount of data storage available in a data storage device of the computing device.

18. One or more computer-readable storage media comprising a plurality of instructions stored thereon that in response to being executed cause a computing device to:
  determining, by a computing device, a set of service functions to be performed on the network packet based on the network packet;
  determining, by the computing device, a subset of the set of service functions that may be performed in parallel with other service functions in the set of service functions;
  generating, by the computing device, one or more service function chains based on the set of service functions and the subset of the set of service functions;
  selecting, by the computing device, a preferred service function chain from the one or more service function chains based on a selection criteria; and
  generating, by the computing device, a service function path based on the preferred service function chain.

19. The one or more computer-readable storage media of claim 18, wherein determining the subset of the set of service functions that may be performed in parallel comprises identifying which service functions are at least one of not required to be performed on a critical path of the service function chain or not required to be performed in real-time.

20. The one or more computer-readable storage media of claim 18, wherein determining the set of service functions based on the network packet comprises determining the set of service functions based on at least one of a packet type associated with the network packet, information included in the header of the network packet, or information included in the payload of the network packet.

21. The one or more computer-readable storage media of claim 18, further comprising a plurality of instructions that in response to being executed cause the computing device to:
  receiving an output from one of the service functions of the service function path indicating the service function path requires reconfiguration;
  redetermining the set of service functions in response to the receiving the output;
  redetermining the subset of the set of service functions that may be performed in parallel with other service functions in the set of service functions;
  regenerating one or more service function chains based on the set of service functions and the subset of the set of service functions;
  reselecting the preferred service function chain from the one or more service function chains based on the selection criteria subsequent to the regenerating one or more service function chains; and
  regenerating the service function path based on the preferred service function chain subsequent to the reselecting of the preferred service function chain.

22. The one or more computer-readable storage media of claim 18, further comprising a plurality of instructions that in response to being executed cause the computing device to:
  ordering the set of service functions based on a temporal sequential dependency.

23. The one or more computer-readable storage media of claim 18, wherein selecting the preferred service function chain comprises:
  determining a total latency associated with processing the network packet through each of the service functions for each of the service function chains;
  determining which service function has a lowest total latency; and
  selecting the preferred service function chain based on the service function chain having the lowest total latency.

24. The one or more computer-readable storage media of claim 18, wherein generating the service function path comprises generating one or more virtual machines for each of the set of service functions.

25. The one or more computer-readable storage media of claim 18, wherein generating the service function path comprises generating one or more virtual machines for each of the set of service functions on one or more other computing devices.

* * * * *